United States Patent [19]

Horiuchi et al.

[11] Patent Number: 5,038,564

[45] Date of Patent: Aug. 13, 1991

[54] PULSATOR-OPERATED VALVING WITH REACTION CHAMBER ACCUMULATOR FOR HYDRAULIC BOOSTER SYSTEM

[75] Inventors: Makoto Horiuchi; Atsushi Shimizu, both of Nagano; Yoshitaka Miyakawa; Kazuya Sakurai, both of Saitama, all of Japan

[73] Assignee: Honda Giken Kogyo Kabushiki Kaisha, Tokyo, Japan

[21] Appl. No.: 552,288

[22] Filed: Jul. 12, 1990

[30] Foreign Application Priority Data

Jul. 14, 1989 [JP] Japan .................................. 1-82039

[51] Int. Cl.[5] .............................................. B60T 13/12

[52] U.S. Cl. ........................................ 60/555; 60/550; 60/413; 91/460

[58] Field of Search ...................... 60/413, 547.1, 550, 60/555, 557, 593; 91/370, 371, 372, 373, 460

[56] References Cited

U.S. PATENT DOCUMENTS 4,126,996 11/1978 Leiber ................................ 60/547.1
4,433,543 2/1984 Thomas et al. .................... 60/547.1
4,490,977 1/1985 Fulmer ............................... 60/547.1
4,798,127 1/1989 Levrai et al. ..................... 91/460 X
4,976,105 12/1990 Horiuchi et al. ............. 60/547.1 X

*Primary Examiner*—Edward K. Look

*Assistant Examiner*—George Kapsalas

*Attorney, Agent, or Firm*—Armstrong, Nikaido, Marmelstein, Kubovcik, & Murray

[57] ABSTRACT

A fluid pressure booster device includes a booster body, a control piston in the booster body for forward and rearward movements to define a boosting chamber between the control piston and a rear surface of a master piston of a master cylinder, a valve piston in the control piston for forward and rearward movements and communicating at its front face with the boosting chamber, a reaction piston in the control piston for forward and rearward movements and connected to an operating member, the reaction piston defining a reaction chamber between itself and a rear face of the valve piston, a stroke accumulator having an accumulation chamber connected to the reaction chamber, an inlet valve disposed between the control piston and the valve piston and interposed in a flow passage extending between the boosting chamber and a fluid pressure source, the inlet valve being closed when the valve piston is retracted and opening when the valve piston advances, and an outlet valve disposed between the control piston and the valve piston so as to open when the valve piston is retracted and to be closed when the valve piston advances. This enables a fluid pressure to be applied to the master cylinder in response to the motion of the operating member within a restricted stroke range.

2 Claims, 4 Drawing Sheets

PULSATOR-OPERATED VALVING WITH REACTION CHAMBER ACCUMULATOR FOR HYDRAULIC BOOSTER SYSTEM

BACKGROUND OF THE INVENTION

1. FIELD OF THE INVENTION

The field of the invention is fluid pressure booster devices of the type using a fluid pressure for boosting a master cylinder which is employed to operate brakes, clutches or the like of automobiles.

2. DESCRIPTION OF THE PRIOR ART

As has been disclosed in Japanese patent publication known fluid pressure booster devices of the type having a booster body, a booster piston accommodated in the booster body so as to define a boosting chamber, the booster piston moving forwards upon feeding of a fluid pressure to the boosting chamber to operate the master cylinder, a valve piston slidably accommodated in the booster piston and connected to an operating member, and a control valve which is capable of controlling connection and disconnection between the boosting chamber and a fluid pressure source or a fluid tank in response to forward and rearward movements of the valve piston in order to cause the booster piston to follow the movements of the valve piston.

In the mentioned type of booster devices, however, since the booster piston is constructed to follow the movements of the valve piston which is connected to the operating member, the valve piston has to move a stroke of the same amount as the booster piston and this makes it difficult to achieve an axially compact structure.

SUMMARY OF THE INVENTION

The present invention has been proposed in view of the above circumstances and one object thereof is to provide a fluid pressure booster device of compact structure wherein a fluid pressure is applied to the master cylinder as an actuating pressure therefor at a level corresponding to the movement of the operating member performed within a restricted stroke range.

To achieve the object, according to the present invention, there is proposed a fluid pressure booster device comprising a booster body, a control piston accommodated in the booster body for forward and rearward movements to define a boosting chamber between the control piston and a rear surface of a master piston of a master cylinder, a valve piston accommodated in the control piston for forward and rearward movements and communicating at a front face thereof with the boosting chamber, a reaction piston accommodated in the control piston for forward and rearward movements and connected to an operating member, the reaction piston defining a reaction chamber between itself and a rear face of the valve piston, a stroke accumulator having an accumulation chamber connected to the reaction chamber, an inlet valve disposed between the control piston and the valve piston and interposed in a flow passage extending between the boosting chamber and a fluid pressure source, the inlet valve being closed when the valve piston is retracted and opening when the valve piston advances, and an outlet valve disposed between the control piston and the valve piston so as to open when the valve piston is retracted and to be closed at the time of advancing movement of the valve piston.

With the above arrangement, a fluid pressure of such a level as corresponding to the amount of advancing movement of the reaction piston which is caused by the operating member within a restricted stroke range can be generated in the boosting chamber and therefore it is possible in combination with coaxial disposition of the valve piston and reaction piston to make the booster device compact. Moreover, since it is arranged that the fluid pressure generated in the stroke accumulator is transmitted to the reaction chamber, it is not required to mount a large reaction spring in the reaction chamber and this contributes to making the booster device further compact and also provides such an advantage that the reaction force to be generated in the reaction chamber can be controlled and adjusted by selecting the characteristic of the stroke accumulator and the stroke of the operating member can be freely determined.

Furthermore, even upon failure of the fluid pressure source, the control piston can be moved forwardly by the operating member and the master piston can be operated mechanically.

The above and other objects, features and advantages of the present invention will become apparent from reading the following detailed description of preferred embodiments taken in conjunction with the accompanying drawings.

BRIEF DESCRIPTION OF THE DRAWINGS

The drawings show embodiments according to the invention, wherein.

DETAILED DESCRIPTION OF PREFERRED EMBODIMENTS

Embodiments according to the invention will hereinafter be described in conjunction with the accompanying drawings.

A first embodiment according to the invention will now be described with reference to FIGS. 1 and 2.

Figure 1:
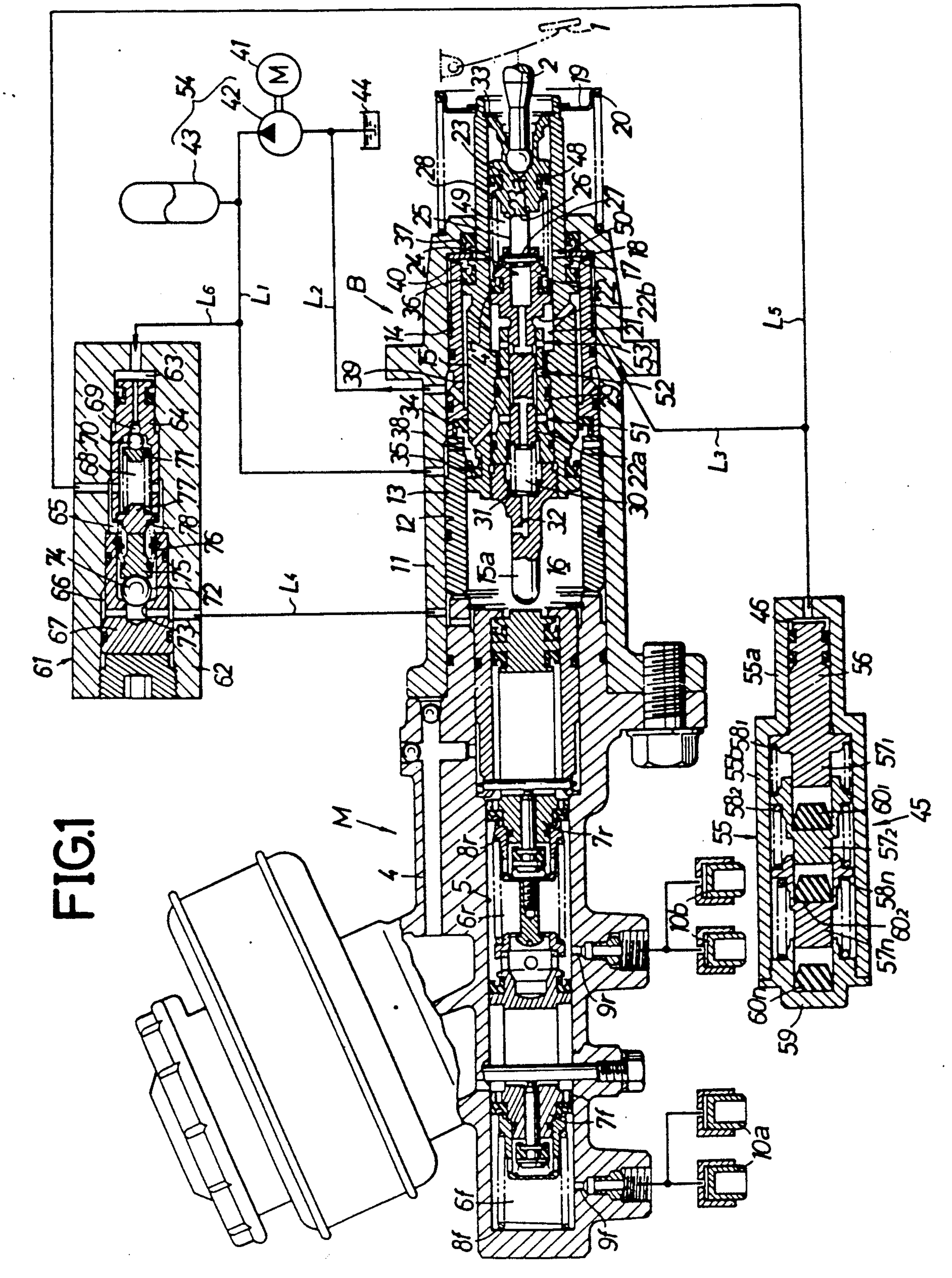
FIG. 1 is a longitudinally sectioned side view of a fluid pressure booster device according to a first embodiment of the present invention.
Figure 2:
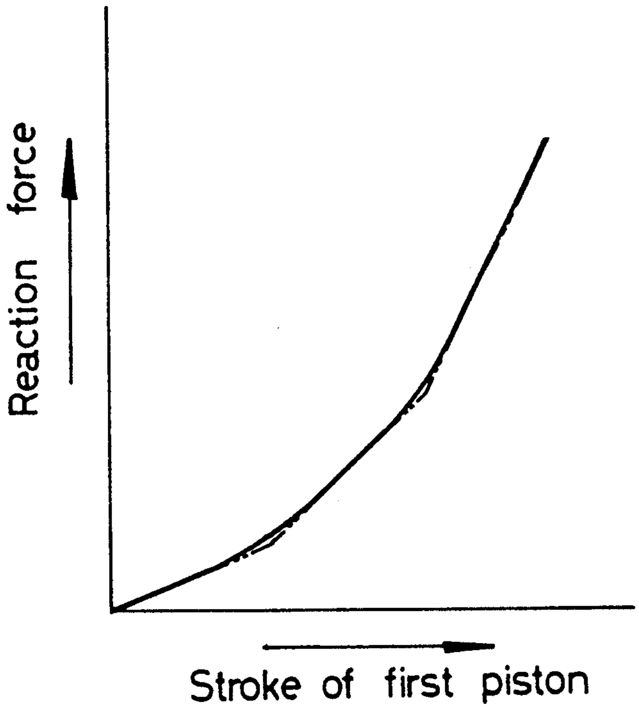
FIG. 2 is a characteristic diagram of a stroke accumulator.

FIG. 1 shows a fluid pressure booster device B which is connected to a rear portion of a master cylinder M for an automobile brake.

The master cylinder M comprises a cylinder body 4 which is formed with a cylinder bore 5 having a closed front end and the cylinder bore 5 slidably receives therein a front master piston **7*f* on a front side and a rear master piston 7*r* on a rear side so as to define a front hydraulic chamber 6*f* between the front end wall and the front master piston 7*f* and a rear hydraulic chamber 6*r* between the master pistons 6*f* and 7*f*. A front return spring 8*f* and a rear return spring 8*r* are accommodated in the front hydraulic chamber 6*f* and the rear hydraulic chamber 6*r*, respectively, so as to urge their associated front master piston 7*f* and rear master piston 7*r* in the retracting direction. Accordingly, pushing the rear master piston 7*r* forwardly causes an advancing movement of the front master piston 7*f* while compressing both the return springs 8*f* and 8*r* and thereby reduces the volumes of the front and rear hydraulic chambers 6*f* and 6*r* to enable hydraulic brake pressures to be outputted from output ports 9*f* and 9*r*** of the hydraulic chambers 6*f* and 6*r*. With these pressures, corresponding wheel brakes 10*a* and 10*b* can be actuated.

To the outer periphery of the rear end portion of the cylinder body 4 is fitted and secured a booster body 11 of the booster device B at its front end portion. The booster body 11 is formed with a cylinder bore 12 and a pair of front and rear sleeves 13 and 14 are fitted to the bore 12.

A control piston 15 is fitted to the inner peripheral surfaces of these sleeves 13 and 14 for sliding movements in the front and rear directions and a boosting chamber 16 is defined between the control piston 15 and the rear master piston 7*r*.

The retraction limit of the control piston 15 is determined by a flange 17 formed on the outer periphery of this piston 15 at an intermediate portion thereof which then comes into abutment against a stopper ring 18 retained between the rear end of the booster body 11 and the sleeve 14. The control piston 15 is provided at its front end with an output rod 15*a* which normally faces the rear end of the master piston 7*r* with a small gap therebetween.

The rear end portion of the control piston 15 is projected outside from the rear end wall of the booster body 11 and a retainer 19 is held on the projected end portion of the piston 15 for retaining a set spring 20 in compressed state between the retainer 19 and the booster body 11. The set spring 20 serves to hold the control piston 15 at its retracted limit.

The control piston 15 is further provided with a cylinder bore 21 therein to slidably receive a valve piston 22 and a reaction piston 23 on a front side and a rear side, respectively, and the reaction piston 23 is connected at its rear end with a brake pedal 1 as an operating member via a push rod 2.

At opposed surfaces of the valve piston 22 and the reaction piston 23 there are provided a guide bore 24 and a guide shaft 25, respectively, which are slidably fitted with each other. The guide shaft 25 is formed with an elongated hole 26 which is long in the axial direction and a pin 27 penetrating through the elongated hole 26 is secured to the rear end of the valve piston 22. A return spring 28 is interposed in compression between both the pistons 22 and 23 for urging the pistons in a separating direction. Therefore, both the pistons 22 and 23 are normally held at respective positions permitting the pin 27 to abut against the front end wall of the elongated hole 26 where the pistons are separated a maximum distance from each other.

The front part of the valve piston 22 is formed into a slender, shaft-like valve portion 22*a* and this portion 22*a* is fitted into a valve chamber body 29 of sleeve shape which is fixed to a central part of the control piston 15. It is arranged that when the valve piston 22 advances a predetermined stroke relative to the control piston 15, the piston 22 comes into abutment against the rear end of the valve chamber body 29 at its shoulder portion 22*b*.

Within the control piston 15 is defined a spring chamber 30 to which is exposed the front end surface of the valve portion 22*a*, and a return spring 31 is housed in this spring chamber 30 for biasing the valve piston 22 in the retracting direction. The set load of the return spring 31 is determined smaller than that of the aforementioned return spring 28. The spring chamber 30 is always in communication with the boosting chamber 16 via a through port 32 formed in the control piston 15.

The retraction limit of the reaction piston 23 is obtained by the rear end thereof abutting against a stopper ring 33 retained to the rear end portion of the control piston 15.

A seal member 34 is mounted on the sleeve 14 for intimate contact with the outer periphery of the control piston 15 at an axially intermediate portion thereof, whereas on the control piston 15 there are mounted seal members 35 and 36 on front and rear sides of the seal member 34 for intimate contact with the inner peripheries of the sleeves 13 and 14, respectively. A further seal member 37 is mounted to the rear end wall of the cylinder body 11 so as to come in intimate contact with the outer periphery of the control piston 15. An inlet chamber 38, an outlet chamber 39 and an intermediate chamber 40 are defined between the seal members 34, 35, between the seal members 34, 36 and between the seal members 36, 37, respectively.

The inlet chamber 38 communicates with the discharge side of a hydraulic pump 42 driven by an electric motor 41 via a first oil passage $L_1$ and a hydraulic pressure source accumulator 43 is connected to the passage $L_1$. The hydraulic pump 42 and the hydraulic pressure source accumulator 43 constitute a fluid pressure source 54.

The outlet chamber 39 communicates with an oil tank 44 as a fluid tank via a second oil passage $L_2$, and the intermediate chamber 40 communicates with an accumulation chamber 46 of a stroke accumulator 45 via a third oil passage $L_3$.

The valve piston 22 and the reaction piston 23 are mounted with seal members 47 and 48, respectively, which are placed in intimate contact with the inner periphery of the control piston 15 and a reaction chamber 49 is defined between both the seal members 47, 48. This reaction chamber 49 communicates with the intermediate chamber 40 via a through port 50.

Between the valve portion 22*a* and the valve chamber body 29 there are sequentially provided an inlet valve 51, an outlet valve 52 and an opening and closing valve 53 from the front side.

The inlet valve 51 is capable of establishing and cutting communication between the inlet chamber 38 and the spring chamber 30 or the boosting chamber 16 and is operated such that it is closed when the valve piston 22 is at its retraction limit and it opens at the time of an advancing movement of the piston 22.

The outlet valve 52 is capable of establishing and cutting communication between the outlet chamber 39 and the spring chamber 30 and when the valve piston 22 is at the retraction limit, the valve 52 opens whereas when the piston 22 is moving forward, it is closed.

The opening and closing valve 53 is constructed to establish and cut communication between the outlet chamber 39 and the reaction chamber 49 and is operable such that it opens at the retraction limit of the valve piston 22 and is closed at the time of an advancing movement of the piston 22.

The timings of opening and closing operations of the afore-mentioned three valves 51, 52 and 53 are set such that when the valve piston 22 starts advancing from its retraction limit, the opening and closing valve 53 is first closed, then the outlet valve 52 is closed and lastly the inlet valve 51 opens.

The stroke accumulator 45 comprises an accumulator body 55 of a stepped cylindrical shape, a first piston 56 slidably fitted into a smaller diameter portion 55i a of the body 55 to define the accumulation chamber 46 therein, a plurality of second pistons $57_1$, $57_2$, $57_n$ housed serially in a larger diameter portion 55*b* of the accumulator body 55, and a plurality of springs $58_1$, $58_2$, $58_n$ for resiliently biasing the respective second pistons $57_1$, $57_2$, $57_n$ toward the first piston 56. One second piston $57_1$ adjacent to the first piston 56 is integrally coupled or placed in mutually abutment relation to the latter. Spring constants of the springs $58_1$, $58_2$ and $58_n$ are set to become larger in the mentioned order.

Buffer rubbers $60_1$, $60_2$ and $60_n$ are interposed between the second pistons $57_1$ and $57_2$ between $57_2$ and $57_n$; and between the piston $57_n$ and an end wall 59 of the larger diameter portion 55*b* of the accumulator body, respectively, with an axial play remaining between each rubber and opposing piston.

An emergency control valve 61 is connected with fourth to sixth oil passages $L_4$ to $L_6$ which lead to the boosting chamber 16, the stroke accumulator 45 and the hydraulic pressure source accumulator 43, respectively.

The emergency control valve 61 comprises a cylindrical valve housing 62, a piston 64 slidably fitted into the housing 62 to define an oil chamber 63, and a valve seat member 67 fitted in and fixed to the valve housing 62 to define an oil chamber 65 between the member 67 and the piston 64. An annular oil chamber 66 is formed around the outer periphery of the valve seat member 67. The fourth, fifth and sixth oil passages L3, L5 and L6 are connected to the oil chambers 63, 65 and 66, respectively.

The piston 64 is provided with a valve chamber 68 communicating with the oil chamber 65 and a valve port 69 for connecting the valve chamber 68 to the oil chamber 63. In the valve chamber 68 are housed a relief valve 70 for opening and closing the valve port 69 and a relief spring 71 for urging the relief valve 70 in the closing direction.

Moreover, the valve seat member 67 is formed with a valve chamber 72 leading to the oil chamber 65 and a valve port 73 connecting the valve chamber 72 to the oil chamber 66 of the opposite side. In the valve chamber 72 there are housed a cut-off valve 74 for opening and closing the valve port 73, a pressure receiving element 75, and a valve spring 76 urging the cut-off valve 74 in the closing direction via the pressure receiving element 75.

A pressing element 77 capable of abutting against the pressure receiving element 75 is secured to the piston 64 and a return spring 78 is disposed under compression between the pressing element 77 and the valve seat member 67 for urging the pressing element 77 in a direction separating away from the pressure receiving element 75.

The operation of this first embodiment will next be described.

First of all, a description will be directed to the case where the fluid pressure source 54, that is, the hydraulic pump 42 and the hydraulic pressure source accumulator 43 are operating normally.

When the brake pedal 1 is not in depressed condition, the control piston 15, the valve piston 22 and the reaction piston 23 are all held in respective predetermined retraction limit positions by the forces of the set spring 20, return spring 31 and return spring 28, respectively, as shown in FIG. 1. When the valve piston 22 is at its retraction limit, the inlet valve 51 is closed, the outlet valve 52 is open and the opening and closing valve 53 is open, as has been mentioned above. Accordingly, the hydraulic pressure within the hydraulic pressure source accumulator 43 has been introduced into the inlet chamber 38 and is maintained therein by the inlet valve 51.

The boosting chamber 16 is connected to the outlet chamber 39 via the through port 32, spring chamber 30 and outlet valve 52 and further to the oil tank 44 via the second oil passage $L_2$, thus being under atmospheric pressure. With this, the master pistons 7*f* and 7*r* can assume their respective retracted positions.

The accumulation chamber 46 of the stroke accumulator 45 is also under atmospheric pressure since it is connected to the outlet chamber 39 via the opening and closing valve 53.

On the other hand, in the emergency control valve 61, the hydraulic pressure of the hydraulic pressure source accumulator 43 is introduced into the oil chamber 63 through the sixth oil passage $L_6$ and it acts on and urges the piston 64 towards the valve seat member 67 whereby the pressing element 77 holds the cut-off valve 74 in the closed position via the pressure receiving element 75. In case the pressure discharged from the hydraulic pump 42 rises above a predetermined level, the relief valve 70 opens to admit excessive pressure to escape into the oil chamber 68 from the valve port 69. The hydraulic pressure escaped into the oil chamber 68 is then led to the third oil passage $L_3$ via the fifth oil passage $L_5$ and is in consequence released to the oil tank 44.

If the brake pedal 1 is now depressed down for operating the wheel brakes 10*a* and 10*b*, the push rod 2, reaction piston 23, return spring 28 and the valve piston 22 are advanced all altogether (leftwardly in FIG. 1) and in response to an advancing movement of the valve portion 22*a* relative to the valve chamber body 29, the opening and closing valve 53 is first closed, then the outlet valve 52 is closed and finally the inlet valve 51 opens. Through opening of the inlet valve 51 the inlet chamber 38 and the boosting chamber 16 are placed in communication with each other and the hydraulic pressure which has been guided into the inlet chamber 38 is led to the boosting chamber 16. As a result, the master piston 7*r* is advanced in receipt of the hydraulic pressure on the rear surface thereof and therefore the hydraulic pressure is fed from the output ports 9*f*, 9*r* to actuate the wheel brakes 10*a*, 10*f*, as described above.

Since the hydraulic pressure guided into the boosting chamber 16 acts also upon the front surface of the control piston 15, the rearwardly pressing force due to that hydraulic pressure and the resilient force of the set spring 20 are balanced to hold the control piston 15 still at its initial retraction limit position.

The hydraulic pressure within the boosting chamber 16 is also led to the spring chamber 30 and acts on the front surface of the valve portion 22*a* thus generating a reaction force that pushes the valve piston 22 backwards.

When the brake pedal 1 is further depressed down, the reaction piston 23 is caused to advance while compressing the return spring 28 and contracting the volume of the reaction chamber 49 at the front face of the piston 23. After closure of the opening and closing valve 53, however, the reaction chamber 49 is shut up from the outside. Owing to this, further continuous advancing movement of the reaction piston 23 forces the operation oil to be fed from the reaction chamber 49 to the accumulation chamber 46 of the stroke accumulator 45 through the third oil passage $L_3$ and therefore a hydraulic pressure is generated in the accumulation chamber 46 of the stroke accumulator 45 in dependence on the amount of oil fed thereto and is in turn transferred to the reaction chamber 49.

Consequently, the valve piston 22 is urged forwardly while receiving thereon the reaction force supplied from the stroke accumulator 45 and the pressing force of the return spring 28 simultaneously. However, in this condition, the hydraulic pressure from the boosting chamber 16 acts on and pushes the valve piston 22 in the rearward direction in the spring chamber 30 so that the valve piston 22 advances and retreats so as to obtain a balance between the forwardly and rearwardly acting press forces thereby controlling the opening and closing operations of the inlet and outlet valves 51 and 52. The reaction piston 23 also receives thereon the reaction force from the stroke accumulator 45 and the repulsive force of the return spring 28, resulting in that a reaction force acts on the brake pedal 1 in an amount increasing in response to an increase in the pedal depression or in other words to a rise in the hydraulic pressure level in the boosting chamber 16 and depending on the spring characteristics of the stroke accumulator 45 and the return spring 28. An operator senses this force as a braking feeling.

Referring now to the operation of the stroke accumulator 5, if the amount of oil introduced into the accumulation chamber 46 increases and thereby the first piston 56 moves in a direction to enlarge the volume of the accumulation chamber 46, the spring $58_1$ of the smallest spring constant is first compressed by one second piston $57_1$ and when that compression has proceeded a predetermined amount, the buffer rubber $60_1$ becomes compressed and the one second piston $57_1$ comes in abutment against the next second piston $57_2$ and pushes it. Thereafter, the similar operations are to be carried out to compress the spring $58_2$, buffer rubber $60_2$, spring $58_n$ and the buffer rubber $60_n$ sequentially. From this, the spring characteristic of the stroke accumulator 45 can be illustrated as shown in FIG. 2. Namely, the spring force increases like a secondary curve in accordance with the increase in the amount of displacement of the first piston 56. This spring characteristic enables the reaction force to increase moderately at the initial stage of depressing the brake pedal 1 providing an improved controllability of the braking operation and then to increase rapidly and smoothly at the later stage of pedal depression, thus suppressing the increase in the amount of depression without deteriorating the braking feeling.

Incidentally, it should be noted that the mentioned effects may be achieved from any other order of arrangement of the plurality of springs $58_1$, $58_2$ and $58_n$.

Description will next be made on a case where the hydraulic pressure source 54 has failed and no hydraulic pressure can be supplied to the first oil passage $L_1$.

When the brake pedal 1 is depressed in this case, the push rod 2, reaction piston 23, return spring 28 and the valve piston 22 are at first advanced all together and the shoulder portion *22b* of the valve piston 22 abuts against the rear end of the valve chamber body 29.

The control piston 15 provided with the valve chamber body 29 exhibits a relatively large sliding resistance due to the friction of the seal members 35, 36 mounted on its outer periphery and the seal member 37 on the booster body 11 and moreover, the piston 15 is urged toward the retraction limit by the set spring 20, whereby the control piston 15 is not moved at the initial stage after the shoulder portion *22b* abuts against the valve chamber body 29.

Accordingly, when the reaction piston 23 further advances, the return spring 28 is compressed and the reaction chamber 49 is pressurized to permit part of the oil within the chamber 49 to be sent to the stroke accumulator 45 under pressure.

And when the advancing force given to the valve piston 22 by the hydraulic pressure within the reaction chamber 49 rises to a level overcoming the slide resistance of the control piston 15 and the force of the set spring 20, the control piston 15 also starts to advance and accompanying such advancing movement the intermediate chamber 40 between the seal members 36, 37 is enlarged in volume, and any negative pressure generated within the chamber 40 causes the oil in the reaction chamber 49 to be sucked into the intermediate chamber.

When the control piston 15 advances furthermore, the oil within the boosting chamber 16 is sucked into the intermediate chamber 40 via the fourth oil passage $L_4$, valve port 73, valve chamber 72, oil chamber 65 and the fifth oil passage $L_5$. Accordingly, there is not generated such a negative pressure in the intermediate chamber 40 that may hinder the advancing movement of the control piston 15.

As has been described above, the oil flow from the reaction chamber 49 to the stroke accumulator 45 permits a development in compressed deformation of the return spring 28 and at last the shoulder portion *23a* of the reaction piston 23 comes into abutment against the rear end of the valve piston 22 and directly pushes the latter.

Thus, at the final stage, the reaction piston 23, the valve piston 22 and the control piston 15 move forwardly in a unitary structure while pressurizing the boosting chamber 16. At this stage, in the emergency control valve 61, the piston 64 cannot exert a valve closing force on the cut-off valve 74 based on the hydraulic pressure, as a result of which the oil within the boosting chamber 16 is also fed to the intermediate chamber 40 which is then enlarging its volume, through the fourth oil passage $L_4$, valve port 73, oil chamber 65, fifth oil passage $L_5$ and the third oil passage $L_3$. Accompanying this oil flow the output rod *15a* of the control piston 15 can abut against the rear end of the rear master piston *7r* and mechanically push it forwardly. Therefore, even when the control piston 5 is formed of a larger diameter than the rear master piston *7r*, the movement of the control piston 15 can directly be transmitted to the piston *7r* without being accelerated by the oil within the boosting chamber 16.

It should also be noted that though the volume of the inlet chamber 38 is enlarged at the time of advancing movement of the control piston 15, this is accompanied by a compensatory action that a pressure difference generated between the boosting chamber 16 and the inlet chamber 38 declines the outer peripheral lip of the seal member 35 toward the inlet chamber 38 side to form a clearance between the lip and the sleeve 13, thus admitting the oil of the boosting chamber 16 into the inlet chamber 38 through the said clearance. With this arrangement, no pressure difference is generated between the boosting chamber 16 and the inlet chamber 38 for hindering the advancing movement of the control piston 15. Since generation of negative pressure in the inlet chamber 38 and the intermediate chamber 40 can thus be prevented positively, the advancing operation of the control piston 15 can be performed lightly.

Figure 3:
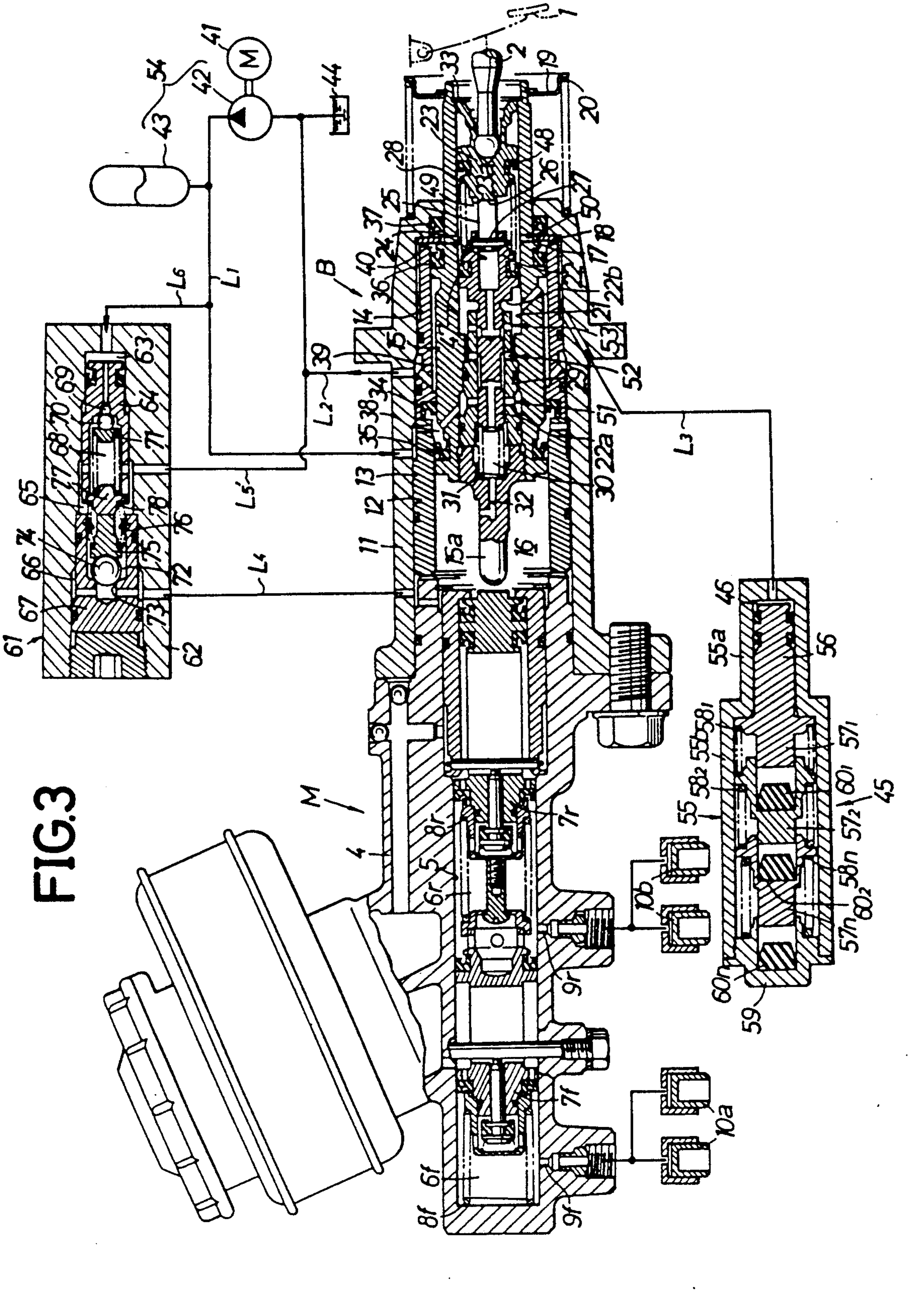
FIG. 3 is a longitudinally sectioned side view of a device according to a second embodiment.

A second embodiment according to the invention will next be described with reference to FIG. 3.

Incidentally, parts corresponding to those of the first embodiment are indicated by the same reference numerals and characters and their detailed explanation will be omitted in the following.

This second embodiment differs from the first embodiment in that a fifth oil passage $L_5'$ leading to the oil chamber 65 of the emergency control valve 61 is connected to a midway of the second oil passage $L_2$ which extends between the oil tank 44 and the outlet chamber 39.

This second embodiment operates in the same manner as the first embodiment when the fluid pressure source 54 is in normally operative condition, but their operations differ from each other upon failure in the source 54. That is, in the latter case, in this second embodiment, the oil of the boosting chamber 16 which is pressurized by the control piston 15 advancing in response to the depression of the brake pedal 1 is discharged to the oil tank 44 through the fourth oil passage $L_4$, the emergency control valve 61, fifth oil passage $L_5'$ and the second oil passage $L_2$. Thereby, the output rod 15*a* of the control piston 15 can abut against the rear end of the rear master piston 7*r* and move it forwardly in a mechanical manner.

When such advancing movement of the control piston 15 causes an enlargement in volume of the intermediate chamber 40 defined between the seal members 36 and 137, the oil in the reaction chamber 49 is sucked into the intermediate chamber 40 and moreover, a pressure difference generated between the outlet chamber 39, which is released to the atmospheric air, and the intermediate chamber 40 acts on the seal member 36 and declines its outer peripheral lip toward the intermediate chamber 40 side, providing a clearance between the lip and the sleeve 14 and admitting the oil of the outlet chamber 39 into the intermediate chamber 40 through the clearance. Accordingly, a negative pressure of such level as hindering the advancing movement of the control piston 15 is not generated in the intermediate chamber 40.

Figure 4:
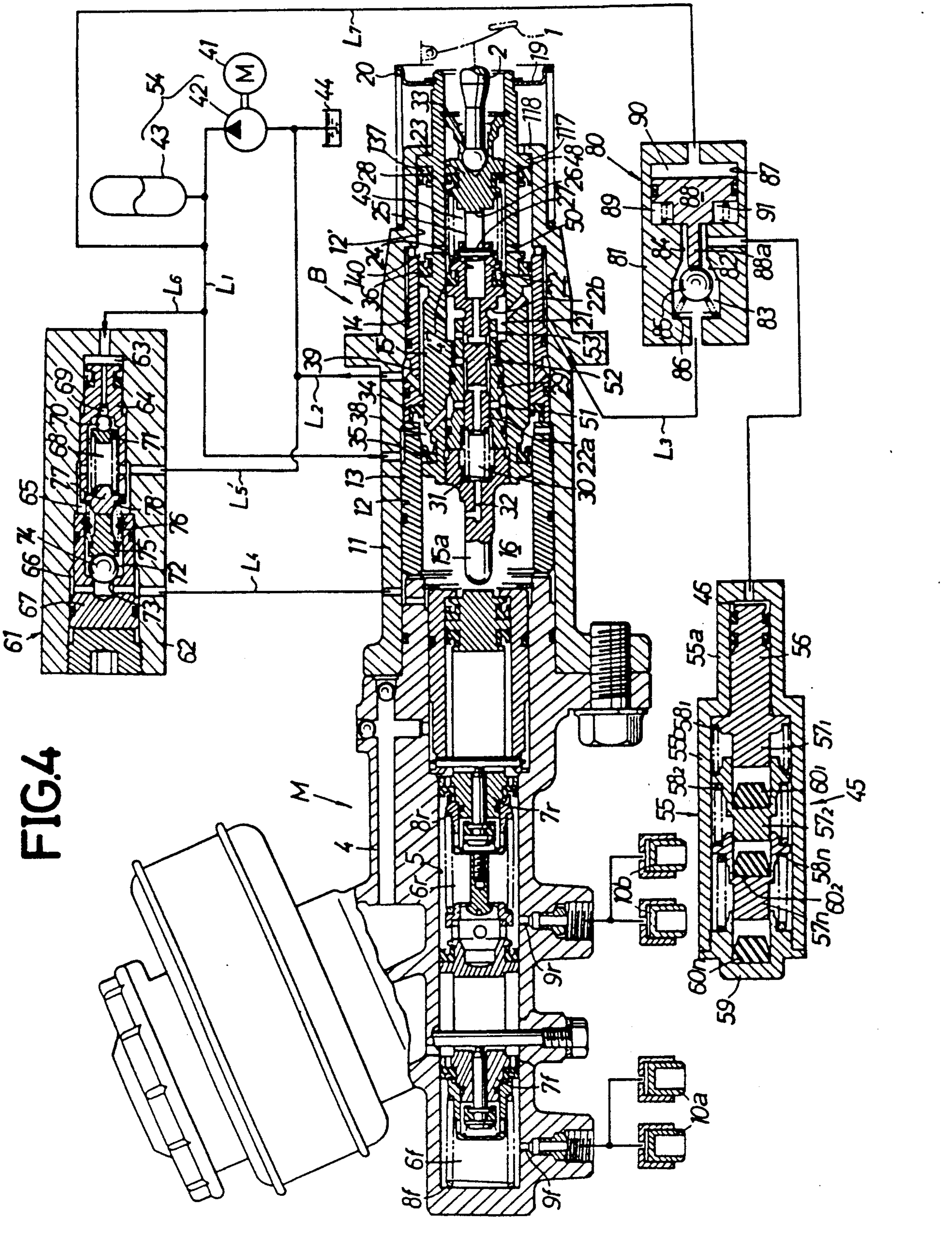
FIG. 4 is a longitudinally sectioned side view of a device according to a third embodiment.

Next, a third embodiment according to the invention will be described with reference to FIG. 4.

This third embodiment corresponds to the afore-mentioned second embodiment in its basic structure but differs therefrom in that the booster body 11 is extended rearwardly longer than the second embodiment, and that a flange 117 is projected radially outwardly from the outer periphery of the control piston 15 adjacent its rear end portion and this flange 117 comes into abutment against a flange 118, which is projected radially inwardly at the rear end portion of the booster body 11, for determining the retraction limit of the control piston 15. Seal member 137 is mounted on the outer periphery of the control piston 15 at the front face of the flange 117 so as to be placed in intimate contact with the inner peripheral surface 12' at the rear end portion of the booster body 11 apart from the seal member 36. An intermediate chamber 140 is defined between the seal member 36 on the front side and the seal member 137. In addition, a cut-off valve 80 is disposed in the third oil passage $L_3$ which connects the intermediate chamber 140 and the accumulation chamber 46 of the stroke accumulator 45.

The construction of the cut-off valve 80 will be described in more detail below. The cut-off valve 80 comprises a valve housing 81 which is provided therein with a valve chamber 83 having one end wall thereof shaped into a conical valve seat 82 and a valve port 84 continuous with the valve seat 82. In the valve chamber 83 are housed a spherical valve member 85 for opening and closing the valve port 84 in cooperation with the valve seat 82 and a valve spring 86 for urging the valve member 85 in the valve closing direction. The valve chamber 83 is connected to the intermediate chamber 40 via an upstream portion of the third oil passage $L_3$ whereas the valve port 84 is connected to the accumulation chamber 46 via a downstream portion of the passage $L_3$.

The valve housing 81 is also provided with a cylinder bore 87 in a side-by-side relation to the valve port 84 and a piston 88 is slidably fitted to this cylinder bore 87 to define a spring chamber 89 on the side of the valve port 84 and an oil chamber 90 on the opposite side. The piston 88 is integrally provided with a projection element 88*a* which extends through the valve port and is opposed at its tip end to the valve member 85, the projecting element 88*a* having such a length that permits closure of the valve member 85 at the right-hand limit of movement of the piston 88 and that forcibly opens the valve member 85 at the left-hand limit of movement of the piston 88 in FIG. 4.

A return spring 91 is accommodated in the spring chamber 89 for urging the piston 88 rightwardly. The oil chamber 90 is connected via a seventh oil passage $L_7$ to the first oil passage $L_1$, that is, to the hydraulic pressure source accumulator 43.

The operation of this third embodiment will next be described.

First of all, in the normal operation of the fluid pressure source 54, when the brake pedal 1 is not depressed, the hydraulic pressure of the hydraulic pressure source accumulator 43 is guided into the oil chamber 90 of the cut-off valve 80 via the seventh oil passage $L_7$ and in receipt of the pressure the piston 88 is moved to the spring chamber 89 side thereby holding the valve member 85 at the open position by the projection 88*a*, thus keeping the third oil passage $L_3$ conducted. Accordingly, the accumulation chamber 46 of the stroke accumulator 45 is placed in communication with the outlet chamber 39 via the third oil passage $L_3$, the intermediate chamber 40, the reaction chamber 49 and the opening and closing valve 53, thus being under the atmospheric pressure. Even when the brake pedal 1 is depressed down in this condition for the purpose of actuating the wheel brakes 10*a*, 10*b*, the third oil passage $L_3$ is kept conducted by the hydraulic pressure acting in the oil chamber 90 and so the reaction chamber 49 is always communicated with the accumulation chamber 46 of the stroke accumulator 45. In consequence, the operation of this embodiment at the time of depressing the brake pedal is the same as of the second embodiment.

Next, an explanation will be made on a case in which the fluid pressure source 54 has failed. In this case, the hydraulic pressure is not supplied to the sixth and seventh oil passages $L_6$ and $L_7$ so that in the cut-off valve 80 the piston 88 is retracted by the force of the return spring 91 and accordingly the valve member 85 is moved by the valve spring 86 to the closed position thereby cutting off the third oil passage $L_3$. If the brake pedal 1 is depressed to advance the reaction piston 23 in this state, the reaction chamber 49 is brought into a locked condition due to the third oil passage $L_3$ having been disconnected by the cut-off valve 80 as described above, as a result of which the oil within the reaction chamber 49 does not flow outside and the advancing movement of the reaction piston 23 can immediately be transmitted to the valve piston 22. Therefore, the reaction piston 23 has no ineffective stroke for the advancing operation of the valve piston 22. Moreover, unlike the preceding embodiments, the seal members 36 and 137 which define the intermediate chamber are both mounted on the outer periphery of the control piston 15 and are capable of advancing with the control piston 15 and sliding on the inner periphery of the sleeve 14 and the inner periphery 12' at the rear end portion of the booster body 11 which are of the same diameter. Therefore, the volume of the intermediate chamber 40 is constant and the hydraulically locked condition of the reaction chamber 49 which is in communication with the chamber 40 is not at all affected. Furthermore, no special means is required for preventing generation of a negative pressure in the intermediate chamber 40.

What is claimed is:

1. A fluid pressure booster device comprising a booster body, a control piston accommodated in the booster body for forward and rearward movements to define a boosting chamber between the control piston and a rear surface of a master piston of a master cylinder, a valve piston accommodated in the control piston for forward and rearward movements and communicating at a front face thereof with the boosting chamber, a reaction piston accommodated in the control piston for forward and rearward movements and connected to an operating member, the reaction piston defining a reaction chamber between itself and a rear face of the valve piston, a stroke accumulator having an accumulation chamber connected to the reaction chamber, an inlet valve disposed between the control piston and the valve piston and interposed in a flow passage extending between the boosting chamber and a fluid pressure source, the inlet valve being closed when the valve piston is retracted and opening when the valve piston advances, and an outlet valve disposed between the control piston and the valve piston so as to open when the valve piston is retracted and to be closed at the time of advancing movement of the valve piston.

2. The device according to claim 1, wherein the control piston comes into abutment against the master piston at a first predetermined advancing position, the valve piston comes into abutment against the control piston at a second predetermined advancing position thereof and the reaction piston comes into abutment against the valve piston at a third predetermined advancing position, and wherein an emergency control valve is interposed in a flow passage connecting the boosting chamber and a fluid tank, the emergency control valve admitting flow of a fluid out of the boosting chamber when a pressure of the fluid pressure source falls below a predetermined level.

* * * * *

UNITED STATES PATENT AND TRADEMARK OFFICE
CERTIFICATE OF CORRECTION

PATENT NO. : 5,038,564

DATED : August 13, 1991

INVENTOR(S) : Makoto HORIUCHI et al

It is certified that error appears in the above-identified patent and that said Letters Patent is hereby corrected as shown below:

Under Foreign Application Priority Data:

On the cover page, Item [30, "1-82039" should read -- 1-182039 --.

Signed and Sealed this

Fifteenth Day of June, 1993

Attest:

MICHAEL K. KIRK

*Attesting Officer* *Acting Commissioner of Patents and Trademarks*